Figure 1:
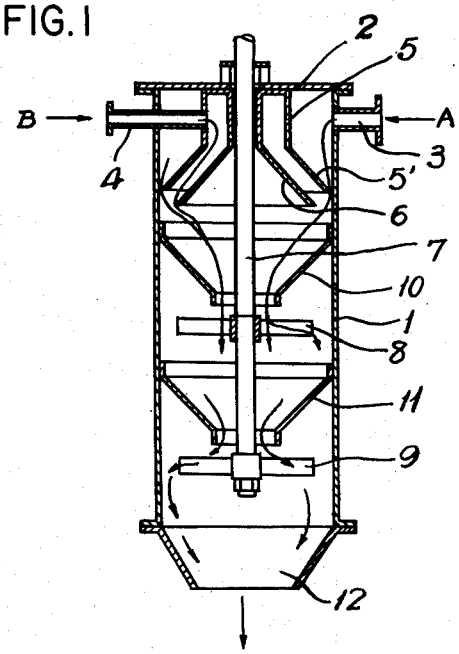

Jan. 8, 1963   MICHIJIRO AKABOSHI ETAL   3,072,464
LIQUID RAPID MIXING METHOD AND APPARATUS
Filed March 1, 1957

United States Patent Office 3,072,464
Patented Jan. 8, 1963

---

3,072,464
LIQUID RAPID MIXING METHOD AND APPARATUS
Michijiro Akaboshi, Kikuji Uragami, and Eiji Fukita, Toyama City, Japan, assignors to Kurashiki Rayon Co., Ltd., Kurashiki-shi, Okayama, Japan, a corporation of Japan
Filed Mar. 1, 1957, Ser. No. 643,418
1 Claim. (Cl. 23—283)

This invention relates to a method of effecting continuous mixing reaction of at least two solutions having different viscosities, and a machine for carrying out the method.

The object of this invention is to provide a method and machine for effecting continuous mixing and reaction of two or more than two liquids, at least one of which having higher viscosity than the other, reaction and solidification being resulted very quickly within a short period.

When two or more than two liquids, at least one of which having higher viscosity, are mixed or reacted with each other, it is difficult to effect a good mixing and reaction within a very short time with heretofore ordinary method, more particularly when a liquid reacts more quickly and has such nature that it produces a solid substance after reaction it is necessary to uniformly mix the liquids within such a short time that the reacting solutions maintain liquid phase and do not solidify in the mixing machine. For example, when a solution of polyvinyl acetate in methanol is mixed with a caustic solution to produce polyvinyl alcohol, the two solutions maintain the liquid phase as they were mixed within several ten seconds from the first instant of mixing, and the viscosity of the solution becomes lowest after several ten seconds, but it becomes gradually higher and the liquid phase becomes pasty state until at least it changes to a solid phase. The complete change to a solid polyvinyl alcohol occurs within a short period such as a few minutes. In such a case, in order to obtain invariably a polyvinyl alcohol of uniform quality by carrying out the reaction continuously, it is necessary to provide a continuous mixing machine which enables sufficiently uniform mixing in a very short time such as several ten seconds and to supply the mixed solution to the next saponifying machine, thereby making the continuous production possible. As above described, if there is a solution of higher viscosity a good continuous mixing can hardly be effected with a heretofore ordinary operation.

The principle of operation of the mixing machine according to this invention is based on flowing down one of the solutions along the inner wall of a casing as a thin layer, and at the same time forcing the other solution to mix and react on the former solution as a thin film or splash taking advantage of its flowing down energy as thin layers, and then again dispersing the mixed solution into splash or thin layers to effect the repeated mixing and reaction until the mixing and reaction are completed, and the object of this invention is to construct such a machine compactly.

Figure 2:
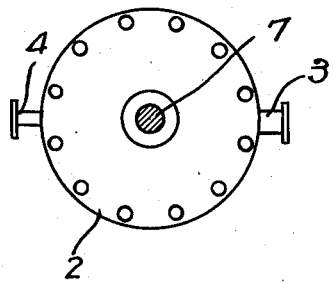
Figure 3:
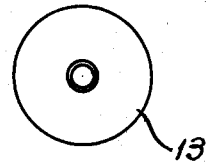
Figure 4:
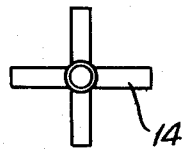
Figure 5:
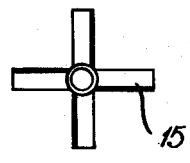
Figure 6:
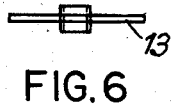
Figure 7:
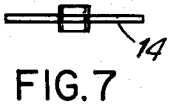
Figure 8:

For a better understanding of this invention, reference is taken to the accompanying drawing, in which FIG. 1 is a sectional elevation of a continuous mixing and reaction machine embodying this invention, FIG. 2 is its top plan view, FIG. 3 shows a plan and FIG. 6 an elevation of an example of an agitating disc, FIGS. 4 and 7 are similar views to FIG. 3 showing its modified form, and FIGS. 5 and 8 are similar views to FIG. 3 showing further modification of agitating blades, Now referring to FIG. 1, 1 designates a cylindrical casing having a top cover 2. According to this invention, a number of pipes corresponding to the number of different kinds of solutions to be mixed, for instance, two inlet pipes 3 and 4 are provided at the upper part of the casing 1, which is divided into a plurality of separate chambers by a partition 5 which has trumpet-shaped lower part 5′ forming a narrow passage between its peripheral edge and the inner wall of the casing 1. Inside the partition plate 5, there is provided another trumpet-shaped partition plate 6, along which a second solution flows down. A vertical shaft 7 passing through the centre of the casing 1 is suitably supported to rotate at a high speed by a suitable driving means (not shown), and has fixed thereto revolving blades 8 and a disc 9. Funnel-shaped guide walls or partition plates 10 and 11 are secured to the inside of the casing 1 to divide the spaces between the partition 6, agitator blades 8 and 9 respectively. 12 represents a delivery opening for reaction products.

FIGS. 3 to 8 represent different type of agitating blades, wherein FIGS. 3 and 6 show a disc wheel 13, FIGS. 4 and 7 a number of blades 14 and FIGS. 5 and 8 show screw blades 15.

The partition plate 6 may be fixed to the shaft 7, if desired, to rotate therewith.

The function and effect of the mixer of this invention will be explained as follows:

This example is taken for mixing polyvinyl acetate and caustic alkaline solution which is a preliminary stage of saponifying reaction in the production of polyvinyl alcohol. If in this case the concentration of an alcoholic solution of polyvinyl acetate is taken at 10 to 25%, the viscosity of this solution is substantially high taking a state of millet-jelly, while the caustic alkaline aqueous solution has lower viscosity as is well known. The quantity of these two solutions to be supplied is determined by the concentrations and molecular ratio of the two solutions from the condition of saponification. The alcoholic solution of polyvinyl acetate (called A-solution) is supplied from the pipe 3 into the casing 1, and the caustic solution (called B-solution) is fed through the pipe 4 into an inner chamber enclosed by the partition 5. The A-solution supplied into the casing 1 flows down in the form of thin film through a narrow circumferential slit between the outer peripheral edge of the partition plate 5′ and the inner surface of the casing 1, and at the same time the B-solution flows down along the upper surface of the funnel-shaped partition plate 6 as a thin layer or is splashed by the partition plate 6 so that the two solutions are mixed together and jointly guided inwards by the guide plate 10 and thrown radially outwards by high speed revolving blades 8 which are located underneath the opening of the funnel-shaped partition 10, and the mixed solution is splashed and impinges on the inner wall of the casing, thereby improving the mixed condition due to the pulverization and disturbance of liquid particles. Further the mixed solution of A and B flowing down inwardly along the guide plate 11 is acted and thrown radially by a revolving disc 9 and becomes a more uniformly mixed state and is delivered out of the opening 12.

During the above operation, the two solutions, A and B make intimate contact with each other and simultaneously commence saponification and the viscosity of solution becomes lower at the portion of uniform and better mixed condition than that of the initial A-solution and is delivered through the outlet opening 12 to the next saponifying machine where the solution begins to raise the viscosity. The reaction of increasing viscosity and solidification begins in a very short period such as several ten seconds since the A—B solutions began to mix so that in heretofore usual processes a sufficiently uniform mixing can never be attained in such a short period, thereby regulating the succeeeding saponifying reaction uniformly.

According to the viscosity and reaction speed of the A—B solutions, the agitating discs or blades as shown in FIGS. 3 to 8 may be used selectively.

As apparent from the foregoing description, this invention has advantages of simple construction and easy operation for enabling substantially uniform mixing of two or more than two kinds of solutions of different viscosities, or at least one of them having higher viscosity, by flowing each of them down as a very thin layer and utilizing the flowing down energy to mix the thin layers with each other and to increase the chance of uniform mixing by increasing the contact area due to the mixing and reaction in the state of thin film, and by splashing the solution as particles by mechanical force, thereby accelerating the mixing under the pulverized state, and then flowing the mixed solution downwards again, and repeating the above operations as desired, maintaining such a short reaction period that the mixed solution does not solidify as the reaction proceeds, so that the solutions of high viscosity or different viscosities which had been very difficult to mix can be continuously mixed and subjected to reaction.

In the foregoing example, an embodiment of this invention as applied to a mixing machine for effecting saponification in the production of polyvinyl alcohol was explained, but the invention is not limited to the above purpose only, and it is possible to obtain a good mixing condition for any kind of mixing solutions if at least one of several solutions has a higher viscosity.

What we claim is:

A continuous mixing and reacting machine for mixing chemically-interacting liquids of different viscosities which comprises a vertical cylindrical casing having an upper liquid inlet zone and a lower liquid discharge zone, a plurality of cylindrical partitions concentrically disposed in the upper portion of said casing, each of said partitions having an inverted funnel-shaped lower portion diverging downwardly and separating the upper liquid inlet zone of said casing into a plurality of separate radially-spaced-apart chambers, each of said chambers being provided with an inlet means for introducing a supply of liquid to be chemically-interacted with the liquid introduced into another of said chambers, the radially-outermost inverted funnel-shaped partition portion defining a narrow annular gap with the inner wall of said casing and each other partition defining a discharge opening at its lower end whereby the liquid discharged therefrom will impinge upon the liquid passing through said narrow annular gap and flow as a film down the inner wall of said casing, a plurality of liquid-guiding and collecting partitions secured to the inner wall of said casing below said first-named partitions, said second-named partitions being axially-spaced from each other and converging downwardly toward the axis of said casing and each having an axial discharge opening, a rotatable shaft extending along the axis of said casing through the discharge openings of said last-named partitions, a plurality of agitating and propelling means carried by said shaft, the agitating and propelling means being disposed directly below the discharge opening of each of said second-named partitions and being constructed to propel the liquid flowing from each outlet opening toward the wall of said casing, and a discharge opening at the bottom of said casing for discharging the interacted mixture resulting from the interaction of the liquids introduced through said inlet means in the upper liquid inlet zone of said casing.

References Cited in the file of this patent
UNITED STATES PATENTS

| | | |
|---|---|---|
| 757,375 | West | Apr. 12, 1904 |
| 1,203,419 | Shiner | Oct. 31, 1916 |
| 1,658,938 | Owens | Feb. 14, 1928 |
| 1,897,856 | Noller | Feb. 14, 1933 |
| 2,000,606 | Othmer | May 7, 1935 |
| 2,042,818 | Allen et al. | June 2, 1936 |
| 2,196,594 | Muskat | Apr. 9, 1940 |
| 2,245,131 | Herrmann | June 10, 1941 |
| 2,714,056 | Poffenberger | July 26, 1955 |
| 2,729,549 | Reman et al. | Jan. 3, 1956 |
| 2,731,081 | Mayner | Jan. 17, 1956 |
| 2,833,630 | Loevenstein | May 6, 1958 |
| 2,910,247 | Allshouse et al. | Oct. 17, 1959 |